United States Patent Office 3,296,218
Patented Jan. 3, 1967

3,296,218
PREPARATION OF POLYAMIDES FROM SUBSTITUTED DIPRIMARY ALCOHOLS, ETHERS OR ESTERS AND DINITRILES
Floyd L. Ramp, West Richfield, Ohio, assignor to The B. F. Goodrich Company, New York, N.Y., a corporation of New York
No Drawing. Filed Sept. 13, 1965, Ser. No. 487,083
6 Claims. (Cl. 260—78)

This invention relates to linear polyamides prepared from the polymerization of substituted aromatic diprimary alcohols or the ethers or esters thereof with dinitriles, and to a process for their preparation.

This application is a continuation-in-part of my application, Serial No. 259,745, filed the 19th day of February 1963, now abandoned.

Commercial linear polyamides generally are prepared by the polymerization of lactams, by the condensation of diamines and dibasic acids, by the self-condensation of amino acids, or by the condensation of dimerized vegetable oil acids and suitable polyamino compounds. In all of these methods for the preparation of linear polyamides the amide linkage is formed by the reaction of a carboxyl group and an amino group. In the preparation of high molecular weight, linear polyamides, by these procedures high temperatures and pressures normally are employed, requiring the use of expensive and heavy equipment.

This invention, which involves the polymerization of certain substituted aromatic diprimary alcohols, or the ethers or esters of such alcohols, with dinitriles, does not involve the reaction of a carboxyl group and an amine group to form the amide linkage of the linear polyamide and does not require the use of high temperatures and pressures that are required in the more conventional methods of polyamide preparation, but instead the polymerization may be run in comparatively simple low pressure apparatus at near room temperature and at atmospheric pressure. Although similar methods for the preparation of linear polyamides at near room temperature and at atmospheric pressure have been disclosed, none of these methods disclose or suggest that a linear polyamide can be prepared from substituted aromatic diprimary alcohols or the ethers or esters of such alcohols, with a dinitrile. Some of the methods that have been disclosed do show the preparation of linear polyamide from alcohols and their esters with dinitriles, but these methods pertain only to the use of tertiary or secondary alcohols or their esters. Previous attempts to prepare a linear polyamide from either an aliphatic or aromatic diprimary alcohol, or the ether or ester thereof, with dinitriles have been unsuccessful (Journal of the American Chemical Society, vol. 71, page 4128 (1949)). Therefore, it has been considered, heretofore, impossible to prepare a linear polyamide from either an aliphatic or aromatic diprimary alcohol or its ethers or ester with dinitriles. It now has been found, however, that certain substituted aromatic diprimary alcohols, ethers or esters will react with dinitriles at near room temperatures and at atmospheric pressure to form linear polyamides at high conversions.

The invention can best be explained by the following reaction:

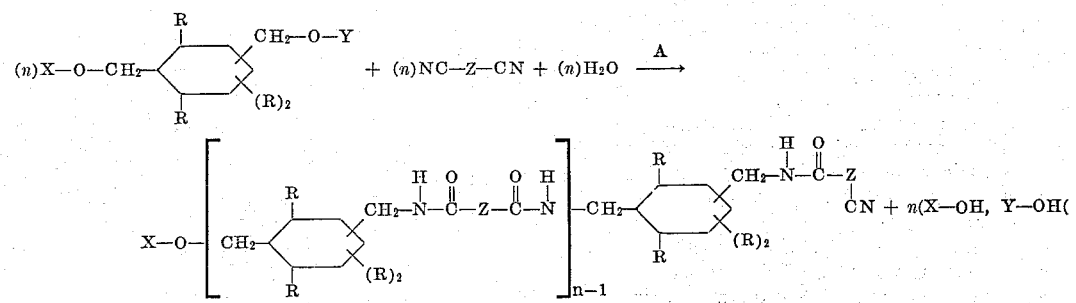
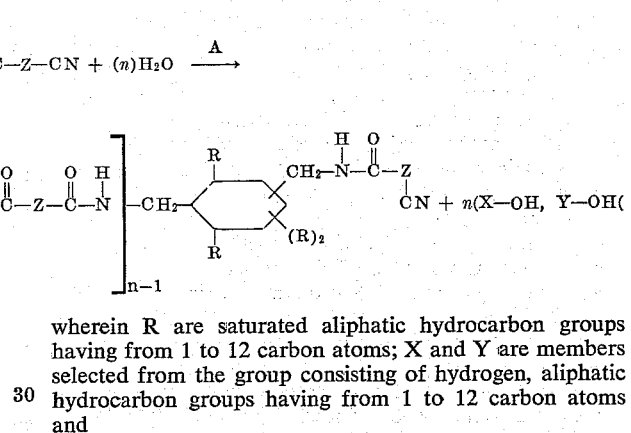

wherein R are saturated aliphatic hydrocarbon groups having from 1 to 12 carbon atoms; X and Y are members selected from the group consisting of hydrogen, aliphatic hydrocarbon groups having from 1 to 12 carbon atoms and

wherein $R_1$ are hydrocarbon groups having from 1 to 11 carbon atoms; A is an acid having a large hydrophylic anion, i.e., an acid whose anion has a nucleophilicity of 2.5 or less, such as sulfuric acid, perchloric, benzene sulfonic acid and the like; Z is a bivalent organic radical free of reactive groups other than the two nitrile groups (since other reactive groups would interfere with the linear polymerization), and $n$ is any whole number greater than zero. Preferably, $n$ is any whole number greater than 10 since, in general when $n$ is greater than 10 the molecular weight of the linear polyamide will be around 5000 which contemplates fiber-forming linear polyamides.

The substituted aromatic diprimary alcohols, ether and esters useful in this invention are those monomers having the structure

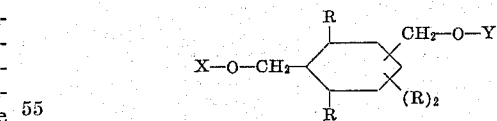

wherein R are saturated aliphatic hydrocarbon groups having from 1 to 12 carbon atoms and X and Y are members selected from the group consisting of hydrogen, aliphatic hydrocarbon groups having from 1 to 12 carbon atoms and

wherein $R_1$ are hydrocarbon groups having from 1 to 11 carbon atoms. The following group of examples will show representative examples of monomers in which X and Y are different:

1-(hydroxymethyl)-4-(methoxymethyl) durene
1-(hydroxymethyl)-4-(acetoxymethyl) durene
1-(methoxymethyl)-4-(acetoxymethyl) durene
1-(methoxymethyl)-4-(ethoxymethyl) durene
1-(acetoxymethyl)-4-(propionoxymethyl) durene
1-(hydroxymethyl)-3-(methoxymethyl)2,4,5,6 tetramethyl benzene
1-(hydroxymethyl)-3-(acetoxymethyl)2,4,5,6 tetramethyl benzene
1-(methoxymethyl)-3-(acetoxymethyl)2,4,5,6 tetramethyl benzene
1-(methoxymethyl)-3-(ethoxymethyl)2,4,5,6 tetramethyl benzene
1-(acetoxymethyl)-3-(propionoxymethyl)2,4,5,6 tetramethyl benzene In the following group of examples X and Y are the same:

1,4-bis(hydroxymethyl) durene
1,4-bis(hydroxymethyl)2,3,5,6 tetraethyl benzene
1,4-bis(hydroxymethyl)2,3,5,6 tetrahexyl benzene
1,4-bis(hydroxymethyl)2,6 dimethyl-3,5 diethyl benzene
1,4-bis(hydroxymethyl)2,3 dimethyl-5,6 diethyl benzene
1,3-bis(hydroxymethyl)2,4,5,6 tetramethyl benzene
1,3-bis(hydroxymethyl)2,4,5,6 tetraethyl benzene
1,3-bis(hydroxymethyl)2,4,5,6 tetrahexyl benzene
1,3-bis(hydroxymethyl)2,6 dimethyl-4,5 diethyl benzene
1,3-bis(hydroxymethyl)2,4 dimethyl-5,6 diethyl benzene
1,4-bis(methoxymethyl) durene
1,4-bis(methoxymethyl)2,3,5,6 tetraethyl benzene
1,4-bis(methoxymethyl)2,3,5,6 tetrahexyl benzene
1,4-bis(methoxymethyl)2,3 dimethyl-5,6 diethyl benzene
1,4-bis(ethoxymethyl) durene
1,4-bis(ethoxymethyl)2,3,5,6 tetraethyl benzene
1,4-bis(ethoxymethyl)2,3,5,6 tetrahexyl benzene
1,4-bis(ethoxymethyl)2,3 dimethyl-5,6 diethyl benzene
1,4-bis(dodecoxymethyl) durene
1,4-bis(dodecoxymethyl)2,3,5,6 tetraethyl benzene
1,4-bis(dodecoxymethyl)2,3,5,6 tetraisopropyl benzene
1,4-bis(dodecoxymethyl)2,3 dimethyl-5,6 diethyl benzene
1,3-bis(methoxymethyl)2,4,5,6 tetramethyl benzene
1,3-bis(ethoxymethyl)2,4,5,6 tetramethyl benzene
1,3-bis(dodecoxymethyl)2,4,5,6 tetramethyl benzene
1,4-bis(acetoxymethyl) durene
1,4-bis(acetoxymethyl)2,3,5,6 tetraethyl benzene
1,4-bis(acetoxymethyl)2,3,5,6 tetrahexyl benzene
1,4-bis(acetoxymethyl)2,3 dimethyl-5,6 diethyl benzene
1,4-bis(lauroxymethyl) durene
1,4-bis(lauroxymethyl)2,3,5,6 tetraethyl benzene
1,4-bis(lauroxymethyl)2,3,5,6 tetrahexyl benzene
1,4-bis(lauroxymethyl)2,3 dimethyl-5,6 diethyl benzene
1,4-bis(benzoyloxymethyl) durene
1,4-bis(benzoyloxymethyl)2,3,5,6 tetraethyl benzene
1,4-bis(benzoyloxymethyl)2,3,5,6 tetrahexyl benzene
1,4-bis(benzoyloxymethyl)2,3 dimethyl-5,6 diethyl benzene
1,3-bis(acetoxymethyl)2,4,5,6 tetramethyl benzene
1,3-bis(propionoxymethyl)2,4,5,6 tetramethyl benzene
1,3-bis(lauroxymethyl)2,4,5,6 tetramethyl benzene
1,3-bis(benzoyloxymethyl)2,4,5,6 tetramethyl benzene A preferred diprimary monomer are those having the structure

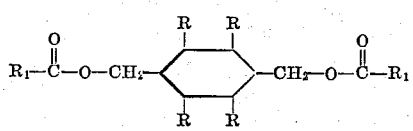

wherein R are saturated aliphatic hydrocarbon groups having from 1 to 12 carbon atoms and $R_1$ is a hydrocarbon group having from 1 to 11 carbon atoms. Such monomers include:

1,4-bis(acetoxymethyl) durene
1,4-bis(acetoxymethyl)2,3,5,6 tetraethyl benzene
1,4-bis(acetoxymethyl)2,3,5,6 tetrahexyl benzene
1,4-bis(acetoxymethyl)2,3 dimethyl-5,6 diethyl benzene
1,4-bis(propionoxymethyl) durene
1,4-bis(propionoxymethyl)2,3,5,6 tetraethyl benzene
1,4-bis(propionoxymethyl)2,3,5,6 tetrahexyl benzene
1,4-bis(propionoxymethyl)2,3 dimethyl-5,6 diethyl benzene
1,4-bis(lauroxymethyl) durene
1,4-bis(lauroxymethyl)2,3,5,6 tetraethyl benzene
1,4-bis(lauroxymethyl)2,3,5,6 tetrahexyl benzene
1,4-bis(lauroxymethyl)2,3 dimethyl-5,6 diethyl benzene
1,4-bis(benzoyloxymethyl) durene
1,4-bis(benzoyloxymethyl)2,3,5,6 tetraethyl benzene
1,4-bis(benzoyloxymethyl)2,3,5,6 tetrahexyl benzene
1,4-bis(benzoyloxymethyl)2,3 dimethyl-5,6 diethyl benzene More preferred diprimary monomers are those having the structure

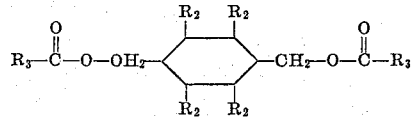

wherein $R_2$ and $R_3$ represent alkyl groups having from 1 to 2 carbon atoms. Such monomers include:

1,4-bis(acetoxymethyl) durene
1,4-bis(acetoxymethyl)2,3,5,6 tetraethyl benzene
1,4-bis(propionoxymethyl) durene
1,4-bis(propionoxymethyl)2,3,5,6 tetraethyl benzene
1,4-bis(acetoxymethyl)2,3 dimethyl-5,6 diethyl benzene Other preferred diprimary monomers are those having the structure

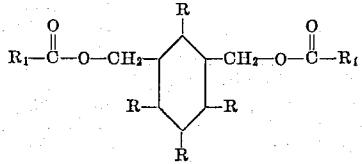

aliphatic hydrocarbon groups having from 1 to 12 carbon atoms and $R_1$ is a hydrocarbon group having from 1 to 11 carbon atoms.
Such monomers include:

1,3-bis(acetoxymethyl)2,4,5,6 tetramethyl benzene
1,3-bis(acetoxymethyl)2,4,5,6 tetraethyl benzene
1,3-bis(acetoxymethyl)2,4,5,6 tetrahexyl benzene
1,3-bis(acetoxymethyl)2,4 dimethyl-5,6 diethyl benzene
1,3-bis(propionoxymethyl)2,4,5,6 tetramethyl benzene
1,3-bis(propionoxymethyl)2,4,5,6 tetraethyl benzene
1,3-bis(propionoxymethyl)2,4,5,6 tetrahexyl benzene
1,3-bis(propionoxymethyl)2,4 dimethyl-5,6 diethyl benzene
1,3-bis(lauroxymethyl)2,4,5,6 tetramethyl benzene
1,3-bis(lauroxymethyl)2,4,5,6 tetraethyl benzene
1,3-bis(lauroxymethyl)2,4,5,6 tetrahexyl benzene
1,3-bis(lauroxymethyl)2,4 dimethyl-5,6 diethyl benzene
1,3-bis(benzoyloxymethyl)2,4,5,6 tetramethyl benzene
1,3-bis(benzoyloxymethyl)2,4,5,6 tetraethyl benzene
1,3-bis(benzoyloxymethyl)2,4,5,6 tetrahexyl benzene
1,3-bis(benzoyloxymethyl)2,4 dimethyl-5,6 diethyl benzene Other preferred diprimary monomers are those having the structure

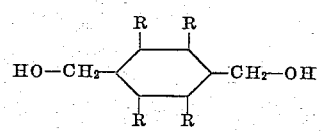

wherein R are saturated aliphatic hydrocarbon groups having from 1 to 12 carbon atoms. Such monomers include:

1,4-bis(hydroxymethyl) durene
1,4-bis(hydroxymethyl)2,3,5,6 tetraethyl benzene
1,4-bis(hydroxymethyl)2,3,5,6 tetrahexyl benzene
1,4-bis(hydroxymethyl)2,3 dimethyl-5,6 diethyl benzene Still other preferred diprimary monomers are those having the structure

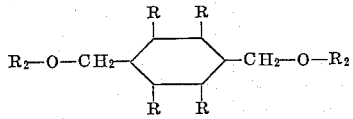

wherein R are saturated aliphatic hydrocarbon groups having from 1 to 12 carbon atoms and $R_2$ are saturated aliphatic hydrocarbon groups having from 1 to 12 carbon atoms. Such monomers include:

1,4-bis(methoxymethyl) durene
1,4-bis(methoxymethyl)2,3,5,6 tetraethyl benzene
1,4-bis(methoxymethyl)2,3,5,6 tetrahexyl benzene
1,4-bis(methoxymethyl)2,3 dimethyl-5,6 diethyl benzene
1,-4bis(ethoxymethyl)2,3,5,6 tetramethyl benzene
1,4-bis(ethoxymethyl)2,3,5,6 tetraethyl benzene
1,4-bis(ethoxymethyl)2,3,5,6 tetrahexyl benzene
1,4-bis(ethoxymethyl)2,3 dimethyl-5,6 diethyl benzene
1,4-bis(dodecoxymethyl)2,3,5,6 tetramethyl benzene
1,4-bis(dodecoxymethyl)2,3,5,6 tetraethyl benzene
1,4-bis(dodecoxymethyl)2,3,5,6 tetrahexyl benzene
1,4-bis(dodecoxymethyl)2,3 dimethyl-5,6 diethyl benzene Copolymers may be formed by polymerizing two or more of the aforesaid substituted aromatic diprimary alcohols or their ethers or esters with one or more dinitriles. Examples of such copolymers are as follows: 1,4 - bis(acetoxymethyl) durene and 1,3 - bis(acetoxymethyl) 2,4-dimethyl-5,6 diethyl benzene with one or more dinitriles; 1,4-bis(acetoxymethyl) durene and 2,4-dimethyl-5,6 diethyl benzene with one or more dinitriles.

The dinitriles are not restricted to any class of compounds. In the structure NC—Z—CN, Z may be any bivalent organic group that does not contain reactive groups other than the nitrile groups since such other reactive groups would interfere with the linear polymerization. This bivalent group may be aliphatic, aromatic, cyclic, heterocyclic, saturated or unsaturated, substituted or unsubstituted. Such monomers include for example: the aliphatic dinitriles having 5 or more carbon atoms such as pentanedinitrile (glutaronitrile), hexanedinitrile(adiponitrile), heptanedinitrile, (pimelonitrile), octanedinitrile(suberonitrile), nonanedinitrile (azelonitrile), decanedinitrile (sebaconitrile), tetradecanedinitrile, octadecanedinitrile, β-methyl adiponitrile, β-phenyl adiponitrile, β, β'oxydipropionitrile; the meta and para aromatic dinitriles such as isophthalonitrile, terephthalonitrile, 2-methyl-1,4 benzene dicarbonitrile, 2,5-dimethyl-1,4 benzene dicarbonitrile, 1,4-benzene diacetonitrile, 1,4-bis(cyanomethyl) durene; the cyclic dinitriles such as 1,4-cyclohexanedicarbonitrile, 1,3-cyclohexanedicarbonitrile and 2-methyl-1, 4-cyclohexanedicarbonitrile; the unsaturated dinitriles such as 1-cyclohexene-1,4 - dicarbonitrile, 1,3 - cyclohexidene-1,4-dicarbonitrile, 1,4 - dicyanobutene - 2. Preferred aliphatic nitriles are those aliphatic nitriles having from 10 to 18 carbon atoms. Such monomers include dodecanedinitrile, tridecanedinitrile, tetradecanedinitrile, pentadecanedinitrile, hexadecanedinitrile, heptadecanedinitrile, octadecanedinitrile ; nonadecanedinitrile, eicosanedinitrile and the like.

Copolymers may be formed by polymerizing two or more of the aforesaid dinitriles with one or more of the aforesaid substituted aromatic diprimary alcohols or their ethers or esters. Examples of such copolymers are as follows: adiponitrile and tetradecanedinitrile polymerized with one or more substituted aromatic diprimary alcohols, or the ethers or esters of the alcohols. Terepthhalonitrile and tetradecanedinitrile polymerized with one or more substituted aromatic diprimary alcohols, or their ethers or esters.

In the preferred practice of this invention it is desirable to polymerize 0.9 to 1.1 moles of dinitrile with 0.9 to 1.1 moles of the substituted aromatic diprimary alcohols, or their ethers or esters. Between 0.9 to 1.1 moles of water, when the ethers or esters of said diprimary alcohol are used as reactants, must be added to the polymerization mixture, either during or after the polymerization in order to get a linear polyamide. If an excess of either the dinitrile or the substituted aromatic diprimary alcohol is used it is realized that the resulting polymer will have a lower molecular weight. When the substituted aromatic diprimary alcohols are used to react withe the dinitriles, it is not necessary that water be added to the polymerization mixture since water is continually formed as a product during the amide formation in the polymerization. When the ethers or esters of the aromatic diprimary alcohols are used to react with dinitriles it is necessary that the proper amount of water be added to the polymerization mixture, since water here is not formed as a product of the amide formation in the polymerization. Even though water is not necessary when alcohols are used, the presence of such has no adverse effect on the polymerization.

In the preferred procedure for making the polyamide, monomers are mixed with a suitable acid at near room temperature for a time sufficient to allow the polymerization to proceed to the desired conversion. The acid then serves as the reaction medium as well as catalyzing the reaction of the monomers. After the completion of the polymerization the polymer is separated from the reaction medium, usually by precipitation. The precipitation normally is accomplished by pouring the reaction mixture into an alcohol-water solution or over cracked ice. The precipitated polymer then can be collected and washed until free of acid.

Although not necessary, it is preferable to dissolve the monomers in a solvent before they are added to the acid component. If the monomers first are dissolved in a solvent, the monomers are more readily dispersed in the acid component and, thus, localized concentration of monomer in the acid is reduced. Chloroform is an effective solvent which frequently is used. The amount of solvent is not critical, but usually only an amount of solvent sufficient to dissolve the monomers is employed.

The acids that are useful in this invention for catalyzing the reaction are those which have a large hydrophilic anion. Expressed differently, these acids are those that have an anion that has a "nucleophilicity" of 2.5 or less. The concept of nucleophilicity is discussed by Hine in section 7–2, pages 159 through 162, of his book, "Physical Organic Chemistry," Second Edition, McGraw-Hill Book Company, Inc., 1962. Examples of acids that are useful in this invention, i.e., have the desired large hydrophilic anion are sulfuric acid, phosphoric acid, perchloric acid, benzene sulfonic acid, toluene sulfonic acid, and alkane sulfonic acid. Examples of acid that do not come within the aforestated definition and thus are not operative in catalyzing the reaction are hydrochloric acid and hydrobromic acid. The acids may be used alone or used as a mixture, for example a mixture of sulfuric and phosphoric acids. The acids may be used as pure acid, i.e., the highest concentration available, or they may be diluted with substances which are miscible with the acids, but also unreactive with the acid. Examples of diluents which can be used are water, acetic acid, formic acid and nitrobenzene. In the preferred procedure for making polyamides, the pure acids may be diluted down to a 50–50 mixture by weight. The term "strong acid" will be used hereinafter to refer to the aforesaid acids or mixtures in pure form or diluted as previously stated.

The reaction of this invention may be carried out at a temperature from about −20° C. to about 80° C. It usually is preferred, however, that the polymerization proceed at near room temperature, i.e., about 20° C. to 40° C. External heating or cooling may be used, if needed, to maintain the polymerization temperature within a desired range. The polymerization should be carried out in a reaction vessel that is constructed of or lined with a material that is inert to the components of the reaction mixture, such as glass or porcelain. The reaction vessel preferably is provided with an agitator since it is desirable during the course of the polymerization continuously to mix the reactants to facilitate heat transfer and to promote the polymerization.

The usual practice is to have the concentration of the monomers in the acid component be between from about 2 to 50 by weight of the pure acid component. The optimum range is between 10 to 20%. The use of more concentrated concentrations result in a viscous composition which is difficult to polymerize conveniently. The monomers, preferably after being dissolved in a suitable solvent as expalined above, are added with stirring to the concentrated acid catalyst, preferably while maintaining the temperature of the mixture at between about 20° to 30° C. The time of polymerization will vary somewhat depending upon the particular monomers used, the temperature of the reaction, the thoroughness of the mixing of the reactants during the reaction, and the particular acid used to catalyze the polymerization. The polymerizations may be run to any desired degree of polymerization depending upon what molecular weight polymer is desired. It usually is desired, however, to carry the polymerizations to a high conversion (preferably to at least 95% conversion) to obtain the higher molecular weight materials. As explained in U.S. Patent 2,628,216 a convenient method of approximating the molecular weight of the polymer is by determining the intrinsic viscosity of the polymer. An intrinsic viscosity from about 0.4 or higher usually is sufficient to produce polyamides capable of being formed into films or filaments. Of course, it is realized that other methods of determining molecular weight could be used, when applicable. After completion of the polymerization, the solvent in which the monomers were dissolved may be recovered from the reaction mixture by vacuum distillation.

The linear polyamide as pointed out above may be separated from the reaction mixture by precipitation. After the polymer has been precipitated, it may be removed from the water-acid mixture by filtration. The polymer is then washed with water until neutral.

The fiber-forming linear polyamides can be spun into continuous filaments in a number of well-known ways. Thus, the fiber-forming polymers of this invention can be melt spun or solvent spun. In the solvent spun process either the dry or wet process may be utilized. With the polymers of this invention that have melting points greater than 300° C. it is not entirely practical, however, to use the melt spinning technique. Examples of suitable solvents for the linear polyamides of this invention in the solvent spinning process are formic acid, sulfuric acid and meta-cresol. By processes known to the art, the polyamides of this invention can be formed into rods, bristles, sheets and the like.

The linear polyamides of this invention that are not useful as fiber-forming materials, i.e., the linear polyamides that have a $n$ value less than 10, are useful, for example, as molding plastics or as modifying materials when grafted onto other polymers.

The invention is illustrated by the following examples.

Example I

A solution of 60 ml. of concentrated $H_2SO_4$ (96% by weight) and 10 ml. of water was prepared and added to a reaction flask that was fitted with a stirrer, thermometer and dropping funnel. A solution of 6.10 grams pimelonitrile (0.05 mole) and 13.91 grams 1,4-bis (acetoxymethyl) durene (0.05 mole) in 125 ml. of $CHCl_3$ was prepared and added drop-wise through the dropping funnel to the reaction flask over a period of 40 minutes at a temperature of 20° to 30° C. The mixture was stirred overnight. After stirring was stopped the $CHCl_3$ was vacuum stripped from the reaction product. The reaction product was poured slowly over a large amount of cracked ice. The product which precipitated was washed until it was free of any acid. From the weight of the polymer it was determined that the reaction had proceeded to 100% conversion. The resulting linear polyamide was found to be soluble in 98% formic acid.

Example II

A linear polyamide was prepared according to the procedure of Example I, except that 1,4-bis(hydroxymethyl) durene was substituted for 1,4-bis(acetoxymethyl) durene. The following recipe was used:

| | |
|---|---|
| Concentrated $H_2SO_4$ (96% by weight) _____ml__ | 60 |
| $H_2O$ _____ml__ | 10 |
| Pimelonitrile (0.05 mole) _____gram__ | 6.1 |
| 1,4-bis(hydroxymethyl) durene (0.05 mole) do____ | 9.7 |
| Chloroform ($CHCl_3$) _____ml__ | 125 |

The polyamide was recovered from the reaction product by pouring the reaction mixture over cracked ice and washing and drying the precipitate formed.

Example III

When 1,4-bis(methoxymethyl) durene (0.05 mole) was substituted for 1,4-bis(hydroxymethyl) durene in the recipe of Example II and the polymerization carried out as there described a linear polyamide again was obtained.

Example IV

A copolymer was prepared according to the procedure of Example I from the following recipe:

| | |
|---|---|
| Concentrated $H_2SO_4$ (96% by weight) ____ml__ | 60 |
| $H_2O$ _____ml__ | 10 |
| Adiponitrile (0.02648 mole) _____grams__ | 2.8664 |
| Azelonitrile (0.01829 mole) _____do____ | 2.7479 |
| 1,4-bis(acetoxymethyl) durene (0.04477 mole) do____ | 12.468 |
| Chloroform _____ml__ | 135 |

The chloroform solution of the monomers was added slowly to the acid in the manner described in Example I. The charge was stirred for 3 hours at which time stirring was stopped. The reaction mixture was allowed to remain overnight in the flask at room temperature. The chloroform was vacuum stripped from the mixture and the polyamide recovered and washed. From the weight of the dried polymer, it was determined that the reaction had gone to a 94% conversion. The linear polyamide was soluble in 98% formic acid.

Example V

The polymerization was run in a flask fitted with a stirrer, thermometer, and dropping funnel. 120 ml. of nitrobenzene was added to the flask. 13.90 grams of 1,4-bis(acetoxymethyl) durene (0.05 mole) and 6.40 grams terephthalonitrile (0.05 mole) then were added. The mixture was stirred to form a suspension. Next a solution of 120 ml. concentrated $H_2SO_4$ (96% by weight) and 20 ml. $H_2O$ was added dropwise to the flask over a period of approximately one hour.

The mixture was stirred overnight and the linear polyamide was isolated by pouring the reaction product into a methanol and water solution (50–50 mixture by volume). After isolation the resulting polymer was washed free of acid with a 50–50 mixture by volume of methanol and water and then dried to constant weight. From the weight of the polymer it was determined that a conversion of 98 percent had been realized.

I claim:
1. A process for preparing a fiber forming linear polyamide which comprises reacting substantially equimolar amounts of at least one monomer having the structure

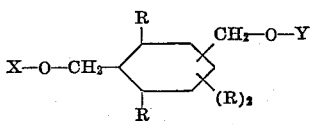

wherein R are saturated aliphatic hydrocarbon groups having from 1 to 12 carbon atoms, X and Y are members selected from the class consisting of hydrogen, aliphatic hydrocarbon groups having from 1 to 12 carbon atoms and

wherein $R_1$ are hydrocarbon groups having from 1 to 11 carbon atoms and at least one dinitrile that is free of other reactive groups in a medium of strong acid and in the presence of water until a polymer of the desired molecular weight is obtained.

2. The process of claim 1 wherein the reaction is run within a temperature range of −20° C. to 80° C.

3. A process for preparing a fiber forming linear polyamide which comprises reacting substantially equimolar amounts of a monomer having the structure

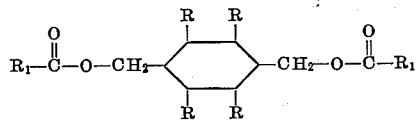

wherein R are saturated aliphatic hydrocarbon groups having from 1 to 12 carbon atoms and $R_1$ are hydrocarbon groups having from 1 to 11 carbon atoms and at least one dinitrile free of other reactive groups at a temperature between about −20° C. to 80° C. in a medium of strong acid and in the presence of water until a polymer of the desired molecular weight is obtained.

4. A process for preparing a fiber forming linear polyamide which comprises reacting substantially equimolar amounts of a monomer having the structure

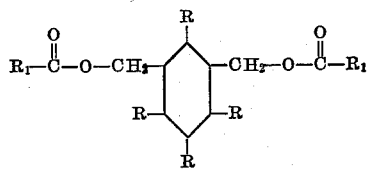

wherein R are saturated aliphatic hydrocarbon groups having from 1 to 12 carbon atoms, and $R_1$ are hydrocarbon groups having from 1 to 11 carbon atoms and at least one dinitrile which is free of other reactive groups in a medium of strong acid and in the presence of water with agitation at a temperature between about −20° C. to 80° C. until a polymer of the desired molecular weight is obtained.

5. A process for preparing a fiber forming linear polyamide which comprises reacting substantially equimolar amounts of a monomer having the structure

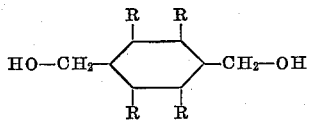

wherein R are saturated aliphatic hydrocarbon groups having from 1 to 12 carbon atoms and at least one dinitrile free of other reactive groups at a temperature between about −20° C. to 80° C. in a medium of strong acid and in the presence of water until a polymer of the desired molecular weight is obtained.

6. A process for preparing a fiber forming linear polyamide which comprises reacting substantially equimolar amounts of a monomer having the structure

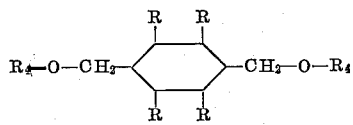

wherein R are saturated aliphatic hydrocarbon groups having from 1 to 12 carbon atoms and $R_4$ are aliphatic hydrocarbon groups having from 1 to 12 carbon atoms and at least one dinitrile free of other reactive groups at a temperature between about −20° C. to 80° C. in a medium of strong acid and in the presence of water until a polymer of the desired molecular weight is obtained.

References Cited by the Examiner

UNITED STATES PATENTS

| 2,317,155 | 4/1943 | Coffman et al. | 260—78 |
| 2,628,216 | 2/1953 | Magat | 260—78 |
| 2,628,218 | 2/1953 | Magat | 260—78 |

FOREIGN PATENTS

| 825,096 | 12/1959 | Great Britain. |
| 849,000 | 9/1960 | Great Britain. |

WILLIAM H. SHORT, *Primary Examiner.*

H. D. ANDERSON, *Assistant Examiner.*